(12) United States Patent
Hayakawa et al.

(10) Patent No.: US 6,178,824 B1
(45) Date of Patent: *Jan. 30, 2001

(54) CHAIN WEAR INDICATOR

(75) Inventors: Shun Hayakawa, Tondabayashi; Tadao Fujimoto, Sakai, both of (JP)

(73) Assignee: Shimano Inc., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/172,241

(22) Filed: Oct. 14, 1998

(51) Int. Cl.$^7$ ..................................................... G01N 3/08
(52) U.S. Cl. ................................................................. 73/828
(58) Field of Search ........................... 73/828, 831, 118.1, 73/162; 33/501.7, 567

(56) References Cited

U.S. PATENT DOCUMENTS

| D. 243,232 | * | 2/1977 | Kuenzig | D10/73 |
|---|---|---|---|---|
| 4,150,488 | * | 4/1979 | Behnke | 33/567 |
| 4,151,625 | * | 5/1979 | Stevanovich | 15/40 |
| 4,888,876 | * | 12/1989 | Meredith et al. | 33/501.08 |
| 5,689,067 | * | 11/1997 | Klein et al. | 73/118.1 |

FOREIGN PATENT DOCUMENTS

| 90160002 | 3/1991 | (DE) . |
|---|---|---|
| 91108969 | 1/1992 | (DE) . |
| 29508570 U | 10/1995 | (DE) . |

* cited by examiner

*Primary Examiner*—Max Noori
(74) *Attorney, Agent, or Firm*—Shinjyu Global IP Counselors, LLP (57) ABSTRACT

A chain wear indicator measures the wear in a chain to determine if the chain needs to be replaced. The chain wear indicator includes a body portion with a first end, a second end and first and second sides extending between the first and second ends. The first side of the body portion measures a first predetermined amount of wear in the chain, while the second side of the body portion determines if a new chain is defective. Alternatively, the second side of the body portion measures a second predetermined amount of wear in the chain. Each side of the body portion has three protrusions. The first protrusion extends from the first end of the body portion and has a first roller engaging surface facing in a first direction. The second protrusion extends from the middle of the body portion and has a second roller engaging surface facing in a second direction which is substantially opposite the first direction. The first and second roller engaging surfaces are configured and spaced apart from each other by a distance corresponding a predetermined number of the chain links to place the chain under tension therebetween. The third protrusion extends from the second end of the body portion and has a third roller engaging surface facing in substantially the second direction. The third roller engaging surface is configured and spaced from the second roller engaging surface by a distance corresponding a predetermined number of the chain links plus a pre-selected amount of wear per link to determine if the chain is worn out and needs to be replaced.

38 Claims, 4 Drawing Sheets

FIG. 10

CHAIN WEAR INDICATOR

BACKGROUND OF THE INVENTION

1. Field of the Invention

This invention generally relates to determining the amount of wear in a roller chain. More specifically, the present invention relates to chain wear indicator, which is used to determine when it is time to replace the chain.

2. Background Information

Roller chains are commonly used for transmitting rotational torque from one rotating chain gear or sprocket to a second rotating chain gear or sprocket. When a chain begins to wear, the overall length of the chain becomes longer. This elongation of the chain often results in the chain skipping or popping off the chain sprockets or gears. This results in stoppage of the apparatus or machine utilizing the chain. Moreover, this skipping or popping off of the chain can damage other components of the apparatus.

The most common and easiest way of testing a chain for wear, i.e., elongation, is done by lifting the chain up when it is on the sprocket or gear. If one of the teeth of the sprocket or gear is fully exposed beneath the chain, then the chain is worn out. Of course, this method is very inaccurate. Therefore, various types of devices have been developed to determine the amount of wear that has occurred in the chain. One example is disclosed in German Utility Patent No. 90-16 000. This device is relatively complicated in that it consists of numerous parts. Moreover, this device is relatively expensive to manufacture.

Another device for determining wear in a roller chain is disclosed in German Utility Model No. 91 10 896. This device is very easy to use and relatively inexpensive to manufacture. However, this device not only measures the wear between the link bushings and connecting pins which causes the chain to increase in length, but it also measures the amount of wear that occurs in the rollers. The frictional wear in the rollers of the chain does not result in elongation of the chain and does not significantly affect the performance of the chain. Rather, the elongation of the chain primarily affects the performance of the chain. Accordingly, using this prior art device may result in chains being discarded before the end of their useful life.

Bicycles primarily utilize roller chains for transmitting torque from the rider's pedaling action to the rear wheel via a pair of sprocket assemblies and a roller chain.

In the bicycle racing industry, it is very important to know if a chain needs to be replaced. If the chain is worn out, i.e., elongated, the chain may skip or pop off of the bicycle sprocket or gears and cause the bicycle racer to loose the race. Therefore, bicycle racers need to know precisely when a chain must be replaced.

In view of the above, there exists a need for a chain wear indicator which overcomes the above mentioned problems in the prior art. This invention addresses this need in the prior art as well as other needs, which will become apparent to those skilled in the art from this disclosure.

SUMMARY OF THE INVENTION

One object of the present invention is to provide a chain wear indicator that accurately determines whether a chain is worn out and/or detective.

Another object of the present invention is to provide a chain wear indicator that compensates for the wear in the rollers of the chain.

Another object of the present invention is to provide a chain wear indicator that is relatively inexpensive to manufacture while still capable of accurately measuring wear in a chain.

Another object of the present invention is to provide a chain wear indicator that is relatively easy to used.

In accordance with one aspect of the present invention, a chain wear indicator is provided for determining the wear of a roller chain. The chain wear indicator basically includes a chain wear indicator for determining wear of a roller chain having a plurality of pivotally coupled chain links, the chain wear indicator comprising a body portion; a first protrusion extending from the body portion and having a first roller engaging surface adapted to engage a portion of a first roller of one of the chain links; and a second protrusion extending from the body portion and having a second roller engaging surface adapted to engage a portion of a second roller of one of the chain links which corresponds to the portion of the first roller, the second roller engaging surface being configured and spaced apart from the first roller engaging surface by a distance corresponding to a predetermined number of the chain links plus a first pre-selected amount of wear per link to indicate unacceptability of the roller chain when the roller chain is placed under tension with the first roller contacting the first roller engaging surface and the second roller contacting the second roller engaging surface.

The foregoing objects can also basically be attained by providing a chain wear indicator that includes a body portion with a first end, a second end and first and second sides extending between the first and second ends. The first side of the body portion measures a first predetermined amount of wear in the chain, while the second side of the body portion determines if a new chain is defective. Alternatively, the second side of the body portion measures a second predetermined amount of wear in the chain. Each side of the body portion has three protrusions. The first protrusion extends from the first end of the body portion and has a first roller engaging surface facing in a first direction. The second protrusion extends from the middle of the body portion and has a second roller engaging surface facing in a second direction which is substantially opposite the first direction. The first and second roller engaging surfaces are configured and spaced apart from each other by a distance corresponding a predetermined number of the chain links to place the chain under tension therebetween. The third protrusion extends from the second end of the body portion and has a third roller engaging surface facing in substantially the second direction. The third roller engaging surface is configured and spaced from the second roller engaging surface by a distance corresponding a predetermined number of the chain links plus a pre-selected amount of wear per link to determine wear of the chain.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
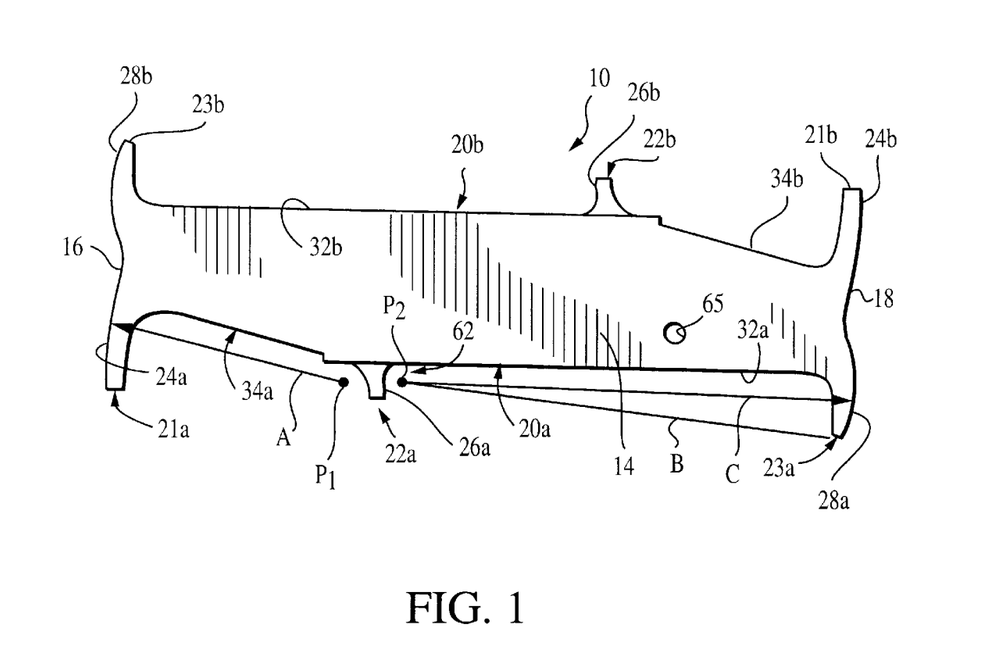
FIG. 1 is a side elevational view of a chain wear indicator in accordance with one embodiment of the present invention.
Figure 2:
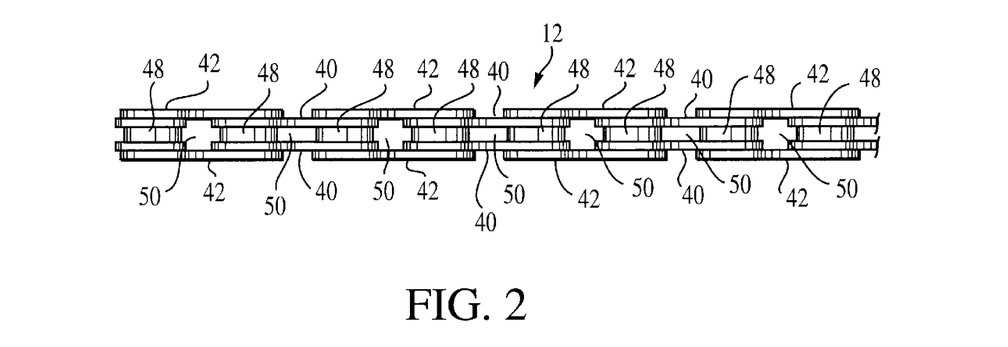
FIG. 2 is a top plan view of a roller chain of the type, which is to be used in connection with the chain wear indicator of FIG. 1.
Figure 3:
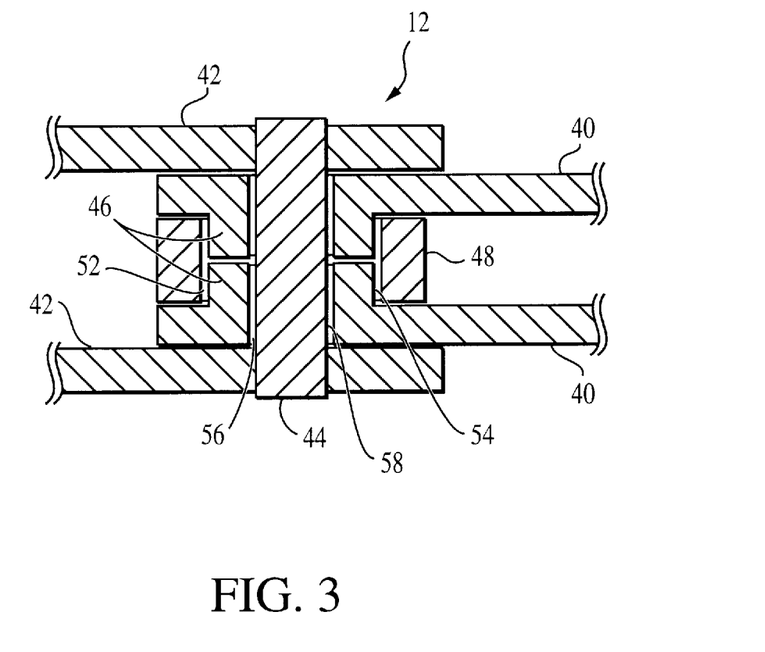
FIG. 3 is an enlarged, cross-sectional view of a chain link connection between a pair of inner links and a pair of outer links of the roller chain illustrated in FIG. 2.
Figure 4:
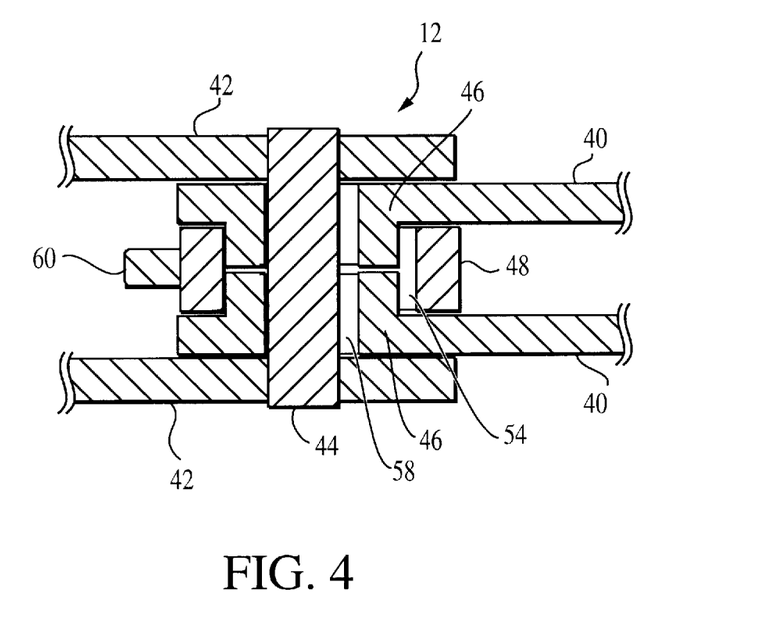
FIG. 4 is an enlarged, cross-sectional view of the chain link connection shown in FIG. 3, but with a driving force being applied to the roller.
Figure 5:
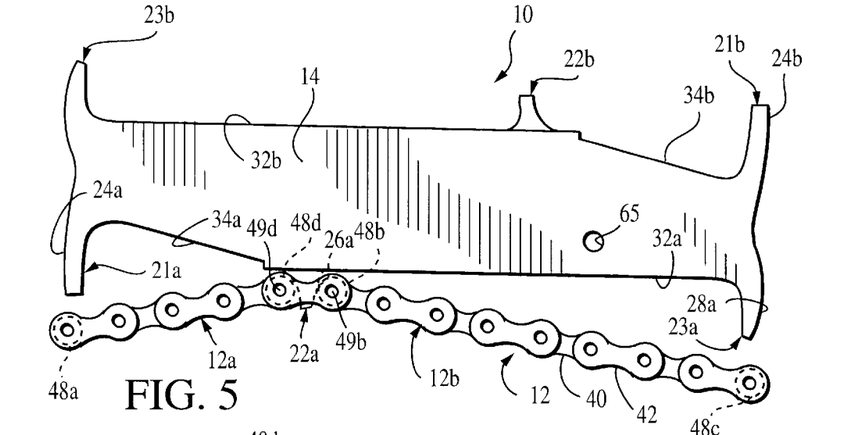
FIG. 5 is a side elevational view of the chain indicator illustrated in FIG. 1 with a roller chain such as the roller chain illustrated in FIG. 2 installed on the middle protrusion.
Figure 6:
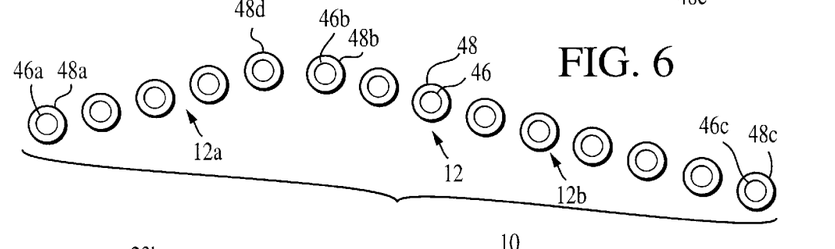
FIG. 6 is a diagrammatic view of the rollers and the link bushings of the chain illustrated in FIG. 5.

Referring initially to FIGS. 1–4, a chain wear indicator 10 (FIG. 1) in accordance with one embodiment of the present invention is illustrated for determining wear or defects in a roller chain 12 (FIGS. 2–4). When roller chain 12 begins to wear, the overall length of chain 12 becomes elongated, i.e., longer. This elongation of chain 12 often results in the chain drooping or popping off of the chain sprockets or gears (not shown). Also, if chain 12 is not replaced, this can result in the chain sprockets or gear becoming damaged.

Chain wear indicator 10 is designed to determine if chain 12 is worn out or is still acceptable. For example, if chain 12 is used with aluminum sprockets or gears and the chain wear per link results in an elongation of the chain of 0.075 mm or more per link, then chain 12 should be replaced. If chain 12 is used with steel sprockets or gears and the chain wear per link results in an elongation of the chain of 0.10 mm or more per link, then chain 12 should be replaced. Accordingly, chain wear indicator 10 should be designed to determine when the chain wear has reached 0.075 mm per link for aluminum sprockets or gears, and/or to determine when the chain wear has reached 0.10 mm for steel sprockets or gears. Alternatively, chain wear indicator 10 can be dimensioned to determine if a new chain is defective as discussed below.

As seen in FIGS. 1 and 5–10, chain wear indicator 10 is a substantially flat member constructed of a substantially rigid material such as stainless steel. Chain wear indicator 10 of the illustrated embodiment preferably performs two functions. First, chain wear indicator 10 measures or indicates if the wear in chain 12 has passed a pre-selected wear limit, and thus, if chain 12 needs to be replaced. Second, chain wear indicator 10 tests a new chain to determine if the new chain is defective.

Chain wear indicator 10 basically includes a body portion 14 with a first end 16, a second end 18 and first and second sides 20a and 20b extending between first and second ends 16 and 18. First side 20a of body portion 14 measures or indicates a first predetermined amount of wear in chain 12. In other words, first side 20a of body portion 14 is designed to test a worn chain to determine whether the chain needs to be replaced. Second side 20b of body portion 14, on the other hand, is designed to test a new chain to determine if the new chain is defective. Alternatively, second side 20b of body portion 14 measures or indicates a second predetermined amount of wear in chain 12. For example, first side 20a can be used to measure when the chain wear has reached 0.075 mm per link, and second side 20b can be used to measure when the chain wear has reached 0.10 mm per link.

In the preferred embodiment, each side of the body portion 14 has three protrusions that engage chain 12. First side 20a of body portion 14 has first, second and third protrusions 21a, 22a and 23a, respectively. Similarly, second side 20b of body portion 14 has first, second and third protrusions 21b, 22b and 23b, respectively. First side 20a of body portion 14 and second side 20b of body portion 14 are substantially identical, except for the dimensions. Therefore, second side 20b of body portion 14 will not be discussed in as much detail as first side 20a of body portion 14.

Accordingly, it will be apparent that the description of first side 20a of body portion 14 basically also applies to second side 20b of body portion 14.

First protrusion 21a extends from one end of body portion 14, and has a first curved roller engaging surface 24a facing in a first direction. Second protrusion 22a extends from the middle of body portion 14, and has a second curved roller engaging surface 26a facing in a second direction which is substantially opposite the first direction. First and second roller engaging surfaces 24a and 26a are configured and spaced apart from each other by a distance corresponding a predetermined number of the chain links to place section 12a of worn chain 12 under tension therebetween. The third protrusion 23a extends from the other end of body portion 14, and has a curved roller engaging surface 28a facing in substantially the second direction. The third roller engaging surface 28a is configured and spaced from the second roller engaging surface 26a by a distance corresponding a predetermined number of the chain links plus a pre-selected amount of wear per link to determine if chain 12 is worn out and needs to be replaced.

Still referring again to FIG. 1, first side 20a has a first substantially planar side surface 32a with first protrusion 21a and second protrusion 22a extending outwardly therefrom, and a second planar side surface 34a extending between second protrusion 22a and third protrusion 23a. In the preferred embodiment, second side surface 34a is angled relative to first side surface 32a, and is sloped approximately 12.50 degrees inwardly from first side surface 32a towards the center longitudinal axis of body portion 14.

Referring now to chain 12 which is particularly illustrated in FIGS. 2–4. Roller chain 12 has a plurality of inner links 40 and a plurality of outer links 42, which are connected between adjacent pairs of inner links 40 by connecting pins 44. Each end of the inner links 40 preferably has a link bushing 46, which surrounds a portion of the associated connecting pin 44. A roller 48 is located around each of the link bushings 46 to allow free rotation of rollers 48 around link bushings 46. A space 50 is formed between adjacent rollers 48 for receiving a tooth 60 of a sprocket or gear in a conventional manner. Since chain 12 is a conventional chain, chain 12 will not be discussed or illustrated in detail herein, except as necessary to describe the chain wear indicator 10 of the present invention.

As seen in FIGS. 3 and 4, a cross-sectional view of a chain link connection is illustrated between a pair of inner links 40 and a pair of outer links 42 of roller chain 12. When no pressure is applied to chain 12, spaces 52 and 54 exist between rollers 48 and link bushings 46. Likewise, spaces 56 and 58 exist between link bushings 46 and connecting pins 44 when no pressure is applied to chain 12. When a tooth 60 of a sprocket pushes against one of the rollers 48 of chain 12, space 52 on one side of connecting pin 44 will disappear, since roller 48 is pushed against link bushing 46. Likewise, space 56 will also disappear between link bushing 46 and connecting pin 44, since link bushing 46 pushes against connecting pin 44. On the other hand, spaces 54 and 58 on the other side of connecting pin 44 and link bushing 46 become wider. The increase in width of the spaces 54 and 58 is equal to the decrease in spaces 52 and 56 on the other side of connecting pin 44 and link bushing 46. During rotation of a sprocket, roller 48, link bushing 46 and connecting pin 44 are repeatedly moving against each other to cause frictional wear on the surface of rollers 48, link bushings 46 and/or connecting pins 44.

First protrusion 21a, second protrusion 22a and third protrusion 23a are each sized to be received in one of the spaces 50 of one of the inner or outer links 40 or 42. Preferably, second protrusion 22a is slightly thinner than the remainder of body portion 14 such that the link of chain 12, which straddles second protrusion 22a, rests on first side surface 32a.

Figures 7, 8:
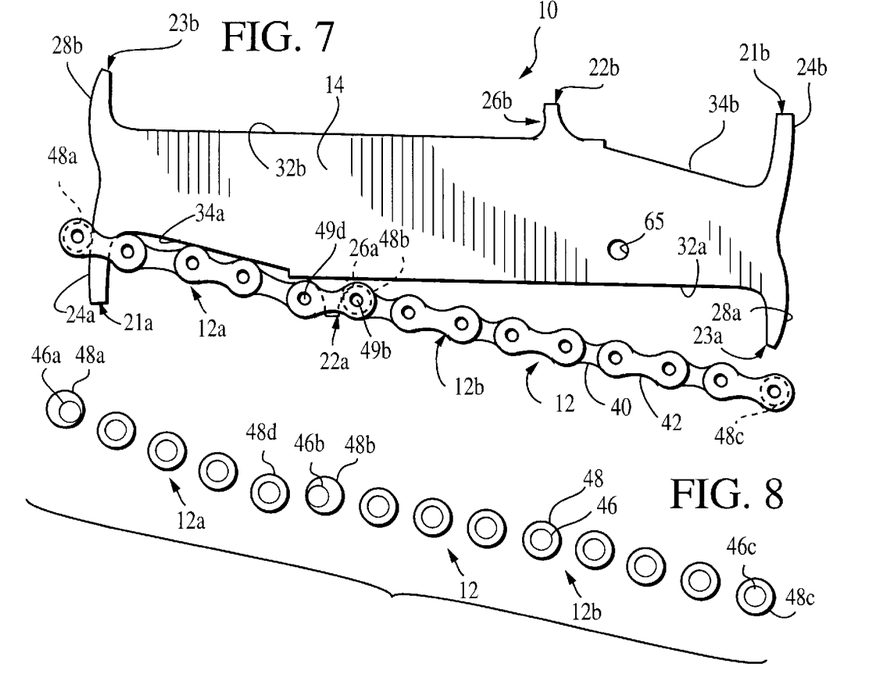
FIG. 7 is a side elevational view of the chain indicator illustrated in FIGS. 1 and 5 with the roller chain being installed on two of the protrusions of the chain indicator so as to place a first section of the chain between the two protrusions under tension.
FIG. 8 is a diagrammatic view of the rollers and the link bushings of the chain illustrated in FIG. 7.
Figure 9:
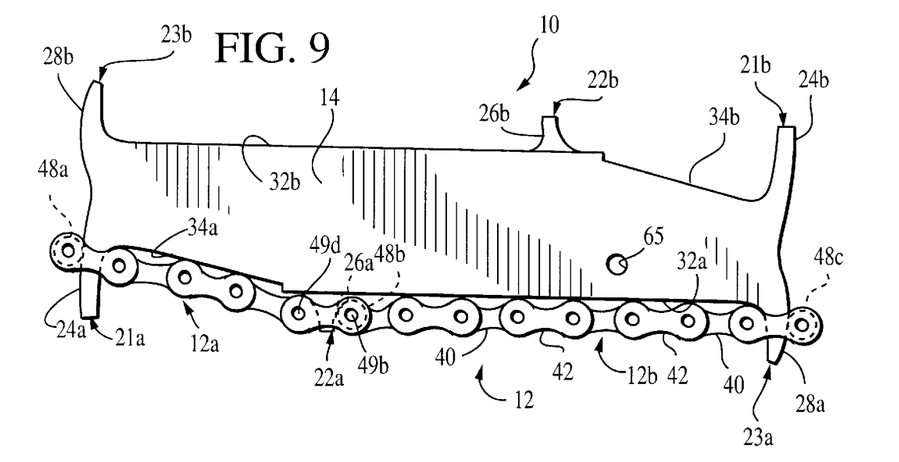
FIG. 9 is a side elevational view of the chain indicator with the chain installed on the three protrusions so that the chain is under tension in both sections.
Figure 10:
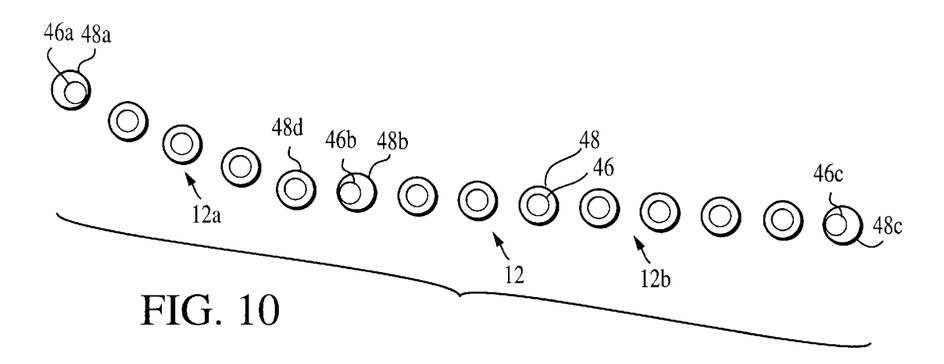
FIG. 10 is a diagrammatic view of the rollers and the link bushings of the chain illustrated in FIG. 11.

First roller engaging surface 24a of first protrusion 21a contacts roller 48a of chain 12, while second roller engaging surface 26a of second protrusion 22a contacts roller 48b. The first section 12a of chain 12 is placed under tension between rollers 48a and 48b when chain 12 is in the positions as seen in FIGS. 7–10. When first section 12a of chain 12 is under tension, one side of roller 48a is pressed against link bushing 46b and one side of roller 48b is pressed against link bushing 46b as seen in FIGS. 8 and 10. With the first section 12a of chain 12 placed under tension, second section 12b of chain 12 can be pivoted about axis 49b of roller 48b so that third roller engaging surface 28a of third protrusion 23a engages roller 48c. If second section 12b of chain 12 is within acceptable wear limits, e.g., a new chain or a slightly worn chain, then roller 48c either will not be able to fully engage third roller engaging surface 28a or will not slide completely down third roller engaging surface. A chain which is worn past the acceptable wear limits will slide completely down third roller engaging surface 28a so that second section 12b lies flat against first planar side surface 32a.

First roller engaging surface 24a of first protrusion 21a is preferably a curved surface which engages roller 48a. This curved surface 24a is designed such that the distance between first roller engaging surface 24a and center axis 49d or point $P_1$ increases as roller 48a moves inwardly from the free end of first protrusion 21a towards the center longitudinal axis of chain wear indicator 10. Accordingly, as roller 48a moves along first roller engaging surface 24a, first section 12a of chain 12 is placed under tension. In the case of a 0.075 mm per link wear limit, the distance represented by line A of FIG. 1 between center axis 49d and the bottom functional point of first roller engaging surface 21a is approximately 47.225 mm with a tolerance of ±0.02 mm.

Second roller engaging surface 26a of second protrusion 22a preferably includes a curved portion having a radius, which substantially matches the radius of rollers 48b of chain 12. Accordingly, second roller engaging surface 26a of second protrusion 22a forms a recess 62 on its side facing away from first projection 21a and facing towards third projection 23a. Accordingly, second roller engaging surface 26a has an axis $P_2$ which substantially coincides with the axis 49b of rotation of roller 48b. Second roller engaging surface 26a is preferably positioned at an angle of about 75° relative to the center longitudinal axis of body portion 14. The outside or free end of second roller engaging surface 26a is lengthened by a linear section on the free end of first protrusion 21a, which also forms an angle of about 75° with the center longitudinal axis of body portion 14.

Third roller engaging surface 28a of third protrusion 23a is also preferably a curved surface that is configured to increasingly place second section 12b of chain 12 under tension between second protrusion 22a and third protrusion 23a. Third protrusion 23a can be designed in any manner, provided only that it permits the described function. Preferably, third roller engaging surface 28a of third protrusion 23a is provided on its side facing away from second protrusion 22a and facing in the same direction as second roller engaging surface 26a. Third roller engaging surface 28a is preferably designed so that its free end can be inserted into space 50 adjacent roller 48c. In the case of a new roller chain 12, third protrusion 23a will just contact roller 48c at its free end. In the case of a worn chain 12, third protrusion 23a will extend further into the corresponding space 50 adjacent roller 48c and then with increasing wear third protrusion 23a will invariably penetrate more deeply into the corresponding space 50.

Since the measurement of wear for chain 12 is determined between rollers 48b and 48c with no spaces between rollers 48b, 48c and link bushings 46b, 46c, any wear occurring in rollers 48 will be taken into account by the measurement. In other words, the measurement for determining wear by chain wear indicator 10 compensates for the wear occurring in rollers 48.

By way of example, chain wear indicator 10 will be described as being used with a typical bicycle chain. The length or distance measured between center axes of adjacent connecting pins 44 of each inner or outer links 40 or 42 of a typical bicycle chain is approximately 12.706 mm. Of course, it will be apparent to those skilled in the art from this disclosure that chain wear indicator 10 can be modified to be utilized with other types and sizes of chains.

In the preferred embodiment, chain wear indicator 10 is designed to have five links 40 and/or 42 extending between first and second protrusions 21a and 22a, and eight links 40 and/or 42 extending between second protrusions 22a and 23a. Of course, the number of links 40 and/or 42 which are between protrusions 21a, 22a and 23a can be more or less than illustrated in the preferred embodiment. If chain wear indicator 10 is supposed to extend over eight chain links 40 and 42 (FIGS. 9 and 10), then the spacing or distance between axis 49b of roller 48b and the outer surface of roller 48c facing it is approximately 97.775 mm±0.02 mm for a new chain. In particular, this dimension is determined by measuring the length of eight chain links (101.65 mm) and then subtracting a half roller diameter of 3.875 mm (97.775 mm). The spacing represented by line B should therefore have this size so that third roller engaging surface 28a is reliably engaged with roller 48c without third protrusion 23a being able to fully penetrate into the corresponding space 50.

If the permitted length of elongation of roller chain 12 is about 0.075 mm of wear per chain link, as is the case, for example, during use of aluminum chain wheels or sprockets in bicycle racing, the cited spacing or distance in eight chain links is increased by 0.6 mm to 98.375 mm. The spacing between axis 49b and the end of third roller engaging surface 28a represented by line C should therefore have this size. The lines B and C can have spacings lying between the mentioned values.

If, on the other hand, length elongations, of about 0.10 mm of wear per chain link are only acceptable, as applies in bicycle racing for the use of steel chain wheels or sprockets, then the spacing corresponding to line B remains unchanged. The spacing corresponding to line C is increased to 98.575 mm so that the third protrusion 23a enters the corresponding space 50 with a correspondingly larger length elongation.

In the preferred operation of chain wear indicator 10, chain 12 is first placed on second protrusion 22a such that one of the inner or outer links 40 or 42 straddles second protrusion 22a and roller 48b is located in recess 62 formed by second roller engaging surface 26a. Then, chain 12 is placed on first protrusion 21a such that roller 48b of link straddling first protrusion 21a engages first roller engaging surface 24a of first protrusion 21a to place first section 12a of chain 12 located between first and second protrusions 21a and 22a in tension. In particular, roller 48a engages first protrusion 21a to pull chain 12 to the left as viewed in FIGS. 5–10 such that roller 48a of the link 40 or 42 straddling second protrusion 22a firmly contacts second protrusion 22a.

Next, chain 12 is placed on third protrusion 23a such that roller 48c of link 40 or 42 straddling third protrusion 23a engages third roller engaging surface 28a of third protrusion 23a. If roller 48c can fully slide down third roller engaging surface 28a of third protrusion 23a so that chain 12 can lie flat against first side surface 32a of chain wear indicator 10, then chain 12 is worn out, i.e., at least 0.075 mm per link or more for aluminum components, or at least 0.10 mm per link or more for steel components. If chain 12 cannot slide fully down third protrusion 23a, then chain 12 does not need to be replaced. In other words, third roller engaging surface 28a of the third protrusion 23a is configured so that the further chain 12 slides clown third protrusion 23a, the more wear has occurred in chain 12. The spacing between second and third protrusions 22a and 23a is chosen so that third protrusion 23a cannot fully enter a corresponding space 50 of one of the links 40 or 42, if roller chain 12 is a new or has not reached the pre-selected degree of unacceptability. In this case, the body portion 14 can only assume a clearly visible oblique position relative to roller chain 12.

If the pre-selected dimension, on the other hand, is reached or surpassed, third protrusion 23a can fully enter corresponding space 50 of inner or outer link 40 or 42 to so deeply engage it that first side surface 32a of body portion 14 lies on second section 12b of roller chain 12. A roller chain 12 with a no longer tolerable elongation can therefore be indicated according to the present invention by the simultaneous engagement of projections 21a, 22a and 23a in corresponding chain links 40 and/or 42. A new or still tolerable elongation chain 12, on the other hand, exists when the three protrusions 21a, 22a and 23a cannot be simultaneously introduced into the corresponding spaces 50 of the corresponding chain links 40 and/or 42 or only an intermediate position is attainable between the positions. Therefore, chain wear indicator 10 represents a limit gauge that indicates the state good/bad or worn/not worn.

A hole 65 is formed in body portion 14 adjacent side 20a. Hole 65 acts as an aid to easily recognize which set of the protrusions 21a, 22a, 23a or 21b, 22b, 23b is being used.

Of course, it will be apparent to those skilled in the art from this disclosure that the second set of protrusions 21b, 22b and 23b can be eliminated if chain wear indicator 10 is only designed to be used with one chain size and to determine whether or not the chain needs to be replaced. Likewise, protrusions 21a, 22a and 23a can be eliminated if the chain wear indicator 10 is designed to only be used to determine if a new chain is defective. Alternatively, it will be apparent to those skilled in the art from this disclosure that the second set of protrusions 21b, 22b and 23b can be configured to be utilized to determine if a different size chain is worn out and needs to be replaced. Moreover, it will be apparent to those skilled in the art from this disclosure that a variety of arrangements of the protrusions 21a, 21b, 22a, 22b, 23a and 23b can be utilized for a variety of chains.

While chain wear indicator 10 is illustrated as a generally elongated flat member, it will be apparent to those skilled in the art from this disclosure that chain wear indicator 10 can have a variety of shapes. For example, chain wear indicator 10 can be a circular member in which the first, second and third protrusions extend substantially radially from the circular body portion. Accordingly, the use of the terms first and second directions, as referring to the directions in which the roller engaging surfaces face, should not be limited to planar directions, but should also encompass circular directions.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A chain wear indicator for determining wear of a roller chain having a plurality of pivotally coupled chain links, said chain wear indicator comprising:
   a body portion;
   a first protrusion extending from said body portion and having a first roller engaging surface facing in a first longitudinal direction relative to the roller chain and adapted to engage a portion of a first roller of one of the chain links; and
   a second protrusion extending from said body portion and having a second roller engaging surface facing in said first longitudinal direction relative to the roller chain and adapted to engage a portion of a second roller of one of the chain links which corresponds to the portion of the first roller, said second roller engaging surface being configured and spaced apart from said first roller engaging surface by a distance corresponding to a predetermined number of the chain links plus a first pre-selected amount of wear per link such that wear of the predetermined number of chain links is measured between said first and second roller engaging surfaces to indicate unacceptability of the roller chain when the roller chain is placed under tension, the first roller contacting said first roller engaging surface and the second roller contacting said second roller engaging surface when the roller chain is placed under tension such that wear of the first and second rollers is not measured.

2. A chain wear indicator according to claim 1, wherein said first roller engaging surface includes a first curved section.

3. A chain wear indicator according to claim 2, wherein said first curved section of said first roller engaging surface has a radius corresponding to an outer radius of the first roller.

4. A chain wear indicator according to claim 1, wherein said second roller engaging surface includes a second curved section.

5. A chain wear indicator according to claim 2, wherein said second roller engaging surface includes a second curved section.

6. A chain wear indicator according to claim 5, wherein said first and second curved sections curve in opposite directions with respect to the first and second rollers, respectively.

7. A chain wear indicator according to claim 1, further comprising:
a third protrusion extending from said body portion and having a third roller engaging surface adapted to engage a portion of a third roller of one of the chain links which is opposite to the portions of the first and second rollers, said third roller engaging surface being spaced apart from said first roller engaging surface by a distance corresponding to a predetermined number of the chain links to place the roller chain under tension therebetween.

8. A chain wear indicator according to claim 7, wherein said third roller engaging surface includes a curved section.

9. A chain wear indicator according to claim 7, wherein said first roller engaging surface includes a first curved section.

10. A chain wear indicator according to claim 9, wherein said first curved section of said first roller engaging surface has a radius corresponding to an outer radius of the first roller.

11. A chain wear indicator according to claim 10, wherein said second roller engaging surface includes a second curved section.

12. A chain wear indicator according to claim 11, wherein said third roller engaging surface includes a third curved section.

13. A chain wear indicator according to claim 12, wherein a first planar side surface extends between said first and second protrusions and a second planar side surface extends between said first and third protrusions with said second planar side surface being angled relative to said first planar side surface.

14. A chain wear indicator according to claim 3, wherein said first curved section has a center axis and said second roller engaging surface has an inner end located adjacent said body portion and an outer end located outwardly from said inner end, said second roller engaging surface being configured to be located progressively farther from said center axis of said first curved section as said second roller engaging surface extends from said outer end to said inner end.

15. A chain wear indicator according to claim 14, wherein said inner end of said second roller engaging surface is spaced approximately 98.375 mm from said center axis.

16. A chain wear indicator according to claim 14, wherein said outer end of said second roller engaging surface is spaced approximately 97.775 mm from said center axis.

17. A chain wear indicator according to claim 14, wherein said inner end of said second roller engaging surface is spaced approximately 98.575 mm from said center axis.

18. A chain wear indicator according to claim 1, further comprising:
a third protrusion extending from said body portion and having a third roller engaging surface adapted to engage a portion of a third roller of one of the chain links; and
a fourth protrusion extending from said body portion and having a fourth roller engaging surface adapted to engage a portion of a fourth roller of one of the chain links which corresponds to the portion of the third roller, said fourth roller engaging surface being configured and spaced apart from said third roller engaging surface by a distance corresponding to a predetermined number of the chain links plus a second pre-selected amount of wear per link to indicate unacceptability of the roller chain when the roller chain is placed under tension with the third roller contacting said third roller engaging surface and the fourth roller contacting said fourth roller engaging surface.

19. A chain wear indicator for determining wear of a roller chain having a plurality of pivotally coupled chain links, said chain wear indicator comprising:
a body portion;
a first protrusion extending from said body portion and having a first roller engaging surface facing in a first longitudinal direction along the roller chain;
a second protrusion extending from said body portion and having a second roller engaging surface facing in a second longitudinal direction along the roller chain which is substantially opposite said first direction, said first and second roller engaging surfaces being configured and spaced apart from each other by a predetermined distance to place a predetermined number of the chain links of the roller chain under tension therebetween; and
a third protrusion extending from said body portion and having a third roller engaging surface facing in substantially said second longitudinal direction along the roller chain, said third roller engaging surface being configured and spaced apart from said second roller engaging surface by a distance corresponding to a predetermined number of the chain links plus a preselected amount of wear per link such that wear of the predetermined number of chain links between said second and third roller engaging surfaces is measured and roller wear is not measured to indicate unacceptability of the roller chain.

20. A chain wear indicator according to claim 19, wherein said first roller engaging surface includes a first curved section.

21. A chain wear indicator according to claim 20, wherein said second roller engaging surface includes a second curved section.

22. A chain wear indicator according to claim 21, wherein said second curved section of said second roller engaging surface has a radius corresponding to an outer radius of a roller of the roller chain.

23. A chain wear indicator according to claim 21, wherein said third roller engaging surface includes a third curved section.

24. A chain wear indicator according to claim 23, wherein a first planar side surface extends between said second and third protrusions and a second planar side surface extends between said first and second protrusions with said second planar side surface being angled relative to said first planar side surface.

25. A chain wear indicator according to claim 23, wherein said second curved section has a center axis and said third roller engaging surface has an inner end located adjacent said body portion and an outer end located outwardly from said inner end, said third roller engaging surface being configured to be located progressively farther from said center axis of said second curved section as said third roller engaging surface extends from said outer end to said inner end.

26. A chain wear indicator according to claim 25, wherein said inner end of said third roller engaging surface is spaced approximately 98.375 mm from said center axis.

27. A chain wear indicator according to claim 25, wherein said outer end of said third roller engaging surface is spaced approximately 97.775 mm from said center axis.

28. A chain wear indicator according to claim 25, wherein said inner end of said third roller engaging surface is spaced approximately 98.575 mm from said center axis.

29. A method for determining wear of a roller chain having a plurality of pivotally coupled links arranged to form a longitudinal length with a chain wear indicator, said method for determining wear comprising the steps of:

pressing an internal surface of a first roller against a first link bushing in a first longitudinal direction of the roller chain;

pressing an internal surface of a second roller against a second link bushing in the first longitudinal direction of the roller chain to place the links of the roller chain between the first and second rollers under tension; and measuring wear of the links of the roller chain between a first external surface of the first roller and a second external surface of the second roller to determine the unacceptability of the roller chain, the first and second external surfaces facing in the same direction relative to the longitudinal length of the roller chain such that wear of the first and second rollers is not measured.

30. A method for determining wear of a roller chain according to claim 29, wherein the internal surface of the first roller is pressed against the first link bushing by a first roller engaging surface of a first protrusion of the wear indicator inserted between the first roller and a first adjacent roller.

31. A method for determining wear of a roller chain according to claim 30, wherein the internal surface of the second roller is pressed against the second link bushing by a second roller engaging surface of a second protrusion of the wear indicator inserted between the second roller and a second adjacent roller.

32. A method for determining wear of a roller chain according to claim 31, further comprising the step of:

pressing an internal surface of a third roller against a third link bushing in a second longitudinal direction opposite the first longitudinal direction of the roller chain.

33. A method for determining wear of a roller chain according to claim 32, wherein the internal surface of the third roller is pressed against the third link bushing by a third roller engaging surface of a third protrusion of the wear indicator inserted between the third roller and a third adjacent roller.

34. A method for determining wear of a roller chain according to claim 31, wherein the first roller engaging surface includes a first curved section and the second roller engaging surface includes a second curved section.

35. A method for determining wear of a roller chain according to claim 34, wherein the first and second curved sections curve in opposite directions with respect to the first and second rollers, respectively.

36. A method for determining wear of a roller chain according to claim 33, wherein the third roller engaging surface includes a third curved section.

37. A method for determining wear of a roller chain according to claim 29, further comprising the step of:

pressing an internal surface of a third roller against a third link bushing in a second longitudinal direction opposite the first longitudinal direction of the roller chain.

38. A method for determining wear of a roller chain according to claim 29, wherein wear of at least three links of the roller chain is measured during said measuring step.

* * * * *